(12) United States Patent
Chua et al.

(10) Patent No.: US 7,513,669 B2
(45) Date of Patent: Apr. 7, 2009

(54) LIGHT SOURCE FOR LCD BACK-LIT DISPLAYS

(75) Inventors: Janet Bee Yin Chua, Penang (MY); Yue Hoong Lau, Penang (MY)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 219 days.

(21) Appl. No.: 11/195,200

(22) Filed: Aug. 1, 2005

(65) Prior Publication Data

US 2007/0081329 A1    Apr. 12, 2007

(51) Int. Cl.
*F21V 7/04* (2006.01)
*H01J 1/62* (2006.01)

(52) U.S. Cl. ........................ 362/606; 362/608; 362/609; 362/612; 362/618; 362/627; 313/501; 313/502

(58) Field of Classification Search ................. 362/552, 362/31, 606–609, 612–613, 618, 621, 627, 362/560–561, 84; 313/498, 501–502, 469
See application file for complete search history.

(56) References Cited

U.S. PATENT DOCUMENTS

| | | | | |
|---|---|---|---|---|
| 5,972,419 | A * | 10/1999 | Roitman | 427/66 |
| 6,231,200 | B1 * | 5/2001 | Shinohara et al. | 362/619 |
| 6,600,175 | B1 | 7/2003 | Baretz | |
| 6,637,905 | B1 * | 10/2003 | Ng et al. | 362/601 |
| 7,036,946 | B1 | 5/2006 | Mosier | |
| 2003/0095401 | A1 * | 5/2003 | Hanson et al. | 362/84 |
| 2004/0008504 | A1 * | 1/2004 | Wang et al. | 362/31 |
| 2004/0016938 | A1 * | 1/2004 | Baretz et al. | 257/100 |
| 2004/0100788 | A1 * | 5/2004 | Ju | 362/31 |
| 2006/0001036 | A1 * | 1/2006 | Jacob et al. | 257/98 |
| 2006/0002678 | A1 * | 1/2006 | Weber et al. | 385/146 |
| 2006/0040416 | A1 * | 2/2006 | Sano | 438/14 |
| 2006/0255711 | A1 * | 11/2006 | Dejima et al. | 313/485 |
| 2006/0291238 | A1 * | 12/2006 | Epstein et al. | 362/600 |

FOREIGN PATENT DOCUMENTS

| | | |
|---|---|---|
| EP | 1 256 835 A2 | 11/2002 |
| GB | 2 374 714 A | 10/2002 |
| JP | 2005-353650 A | 12/2005 |

OTHER PUBLICATIONS

UK.Search Report dated Nov. 15, 2006 involving UK counterpart application No. GB0614369.7.

* cited by examiner

*Primary Examiner*—Sharon E Payne
*Assistant Examiner*—Sean P Gramling

(57) ABSTRACT

An apparatus having a light source, light pipe, and light conversion layer is disclosed. The light source includes a plurality of LED dies arranged in an array, each LED emitting light having an excitation wavelength, the light source emitting light within a cone of angles. The light pipe is positioned to receive the light within the cone of angles through an edge surface such that the light within the predetermined cone of angles is totally reflected from the top surface. The light pipe has features that redirect some of the light at angles such that some of the redirected light exits through the top surface. The light conversion layer overlies the top surface and converts light of the excitation wavelength to light in an output spectrum having wavelengths different from the excitation wavelength. A display layer can be placed such that it is illuminated by light from the light pipe.

4 Claims, 4 Drawing Sheets

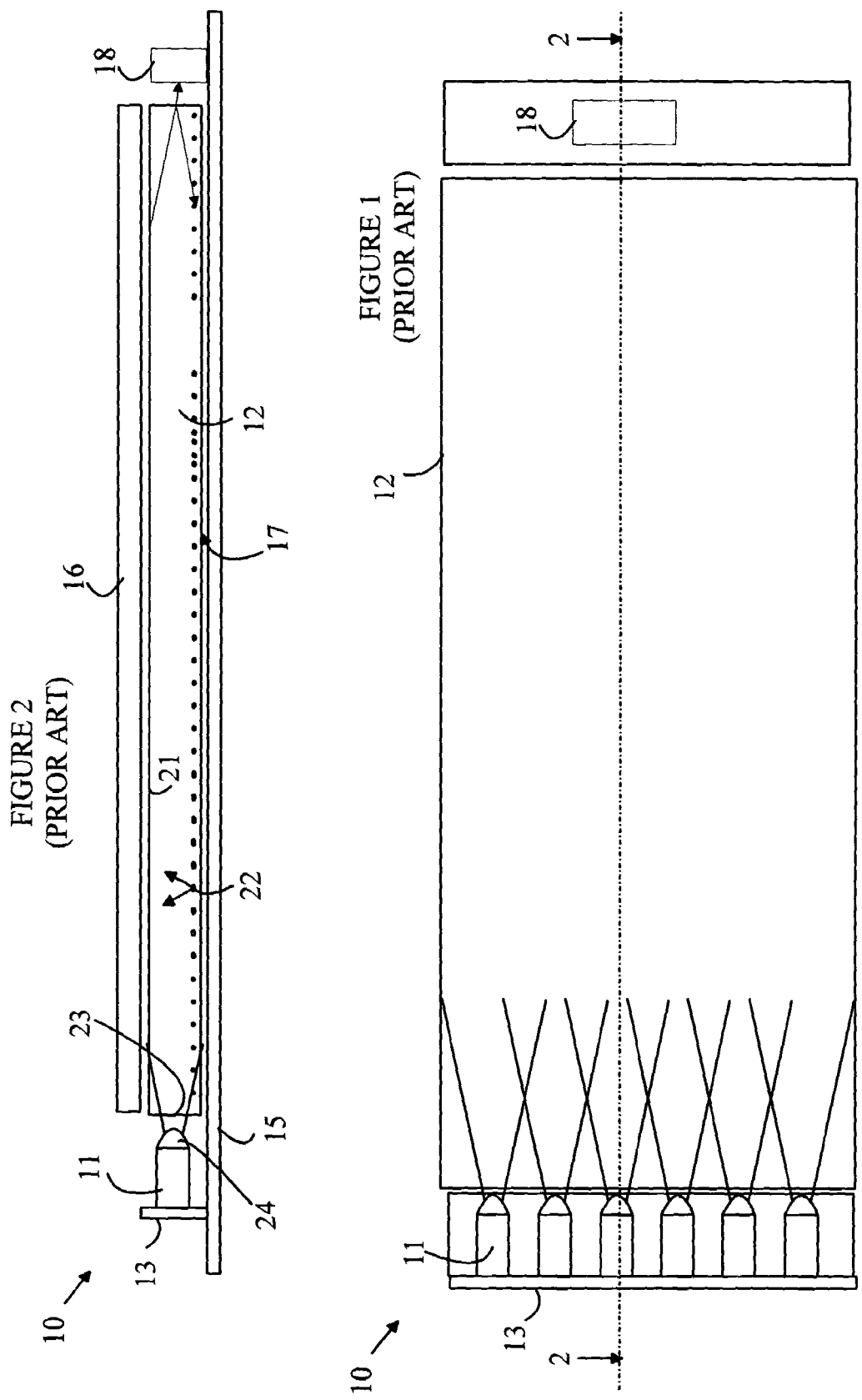

LIGHT SOURCE FOR LCD BACK-LIT DISPLAYS

BACKGROUND OF THE INVENTION

Liquid crystal displays (LCDs) are used in a wide variety of computers and consumer devices such as TVs. A back-lit LCD is an array of pixels in which each pixel acts as a shutter that either passes or blocks light from a light source that is located behind the pixel. Color displays are implemented by equipping the pixels with color filters such that each pixel transmits or blocks light of a particular color. The intensity of the light from each pixel is set by the time the pixel is in the transmissive state.

The display is typically illuminated by a white light source that provides a uniform intensity of light across the back surface of the display. Illumination sources based on fluorescent lights are particularly attractive because of their high light output per watt-hour of power consumed. However, such sources require high driving voltages which makes them less attractive for battery operated devices.

LCD displays for use in handheld devices such as cellular telephones and PDAs must be very thin, as the display represents a significant fraction of the thickness of the device. Light sources based on fluorescent lights are poorly adapted for such thin displays. Back-lit illumination systems for LCD arrays typically utilize some form of light box or light pipe behind the LCD array. Light is injected into this light box at the periphery of the light box. The surface of the light box opposite to the surface that is adjacent to the LCD array has some form of scattering covering that scatters the light so that the back surface of the LCD is uniformly illuminated. The preferred light source is a linear source that generates white light. The linear source is aligned with the edge of the light pipe. To provide efficient coupling of the light into the light pipe, the linear source must have a thickness that is significantly smaller than that of the light pipe.

The thickness of the light source is limited by the thickness of the light box. The thickness of the display is particularly important in displays used for laptop computers and handheld devices such as photodetector arrays and cellular telephones, as the display thickness limits the overall thickness of the device. Some of these portable devices require light boxes that are less than 10 mm thick. As the thickness of the light box is reduced, solutions based on fluorescent lights become more difficult to implement and still maintain a high power conversion efficiency.

As a result, there has been considerable interest in utilizing light sources based on LEDs in such applications. LEDs have similar electrical efficiency and long lifetimes. In addition, the driving voltages needed are compatible with the battery power available on most portable devices. In addition, the size of the light emitter in an LED source is much less than 1 mm. Hence, a linear source constructed from a plurality of LEDs can provide high coupling efficiency even with the thin light pipes discussed above.

A display is typically constructed from an LCD panel that is backlit via a white light source. The panel consists of an array of pixels in which each pixel includes an LCD light gate that either transmits or blocks light from the backlight. Each pixel corresponds to the light of a particular color that is to appear at a particular point in the generated image. Hence, each pixel includes a bandpass filter that selects light of a particular color from the white light generated by the backlight. Typically, three colors are used, red, blue, and green. Hence, an image that is to have N image points requires 3N pixels.

The intensity of light at each pixel as perceived by a person viewing the screen is determined by the time period in which the shutter is open rather than by altering the intensity of the light passing through the shutter. Consider a motion picture that is being displayed on the display. The picture consists of a series of frames that are projected in sequence. The time period that each frame is displayed is so short that the eye can only measure the average light intensity from each pixel over the time period. Hence, a pixel that is open for twice the time that a neighboring pixel appears to be twice as bright, even though the actual intensity of light leaving each pixel is the same during the time periods in which the pixels are open.

An LED light source for illuminating such a display is typically constructed from three colors of LEDs. The relative intensities of the LEDs are adjusted by adjusting the drive current through each LED in light sources for LCD panels that utilize the intensity scheme described above. The light source is typically constructed by alternating the red, blue, and green LEDs along a line that is parallel to an edge of the light pipe to simulate a linear white light source.

Unfortunately, LEDs suffer from aging problems. As the LED ages, the drive current through the LED must be increased to compensate for the aging of the LED. Since the aging effects are different for different color LEDs, the perceived color of the display will shift with age unless the drive currents are altered. In one class of light sources, the intensity of light in each of the color bands is measured by a corresponding set of photodiodes. The drive conditions are then adjusted to maintain the output of the photodiodes at a set of predetermined values corresponding to the desired perceived color for the light source. This approach assumes that all of the LEDs of a particular type age at the same rate and that the LEDs of a given type are driven in series. However, even with this approximation, the additional circuitry and detectors associated with the monitoring operation are a significant factor in the cost of the display.

SUMMARY OF THE INVENTION

The present invention includes an apparatus having a light source, light pipe, and light conversion layer. The light source includes a plurality of LED dies arranged in an array, each LED emitting light having an excitation wavelength, the light source emitting light within a cone of angles. The light pipe includes a layer of transparent material having a top surface, a bottom surface, and an edge surface. The light pipe is positioned to receive the light within the cone of angles through the edge surface such that the light within the predetermined cone of angles is totally reflected from the top surface. The light pipe also includes features that redirect some of the light within the cone of angles at angles such that some of the redirected light exits through the top surface. The light conversion layer overlies the top surface and converts light of the excitation wavelength to light in an output spectrum having wavelengths different from the excitation wavelength. In one embodiment, the dies are arranged in a linear array. In one embodiment, the light conversion layer includes particles of a phosphor compound suspended in a transparent medium. In one embodiment, the particles have a maximum cross-sectional dimension less than the excitation wavelength. In one embodiment, the light conversion layer includes soluble phosphor compounds dissolved in a transparent medium. In one embodiment, a portion of the excitation light exits from the light conversion layer. In one embodiment, the apparatus also includes a display layer overlying the light conversion layer, the display layer being illuminated by light leaving the light conversion layer. In one embodiment, the display layer includes a transparency. In one embodiment, the display layer includes an LCD display panel.

BRIEF DESCRIPTION OF THE DRAWINGS

FIG. 1 is a top view of a prior art light source 10.

FIG. 2 is a cross-sectional view of prior art light source 10 through line 2-2 shown in FIG. 1.

DETAILED DESCRIPTION OF THE PREFERRED EMBODIMENTS OF THE INVENTION

Figure 3:
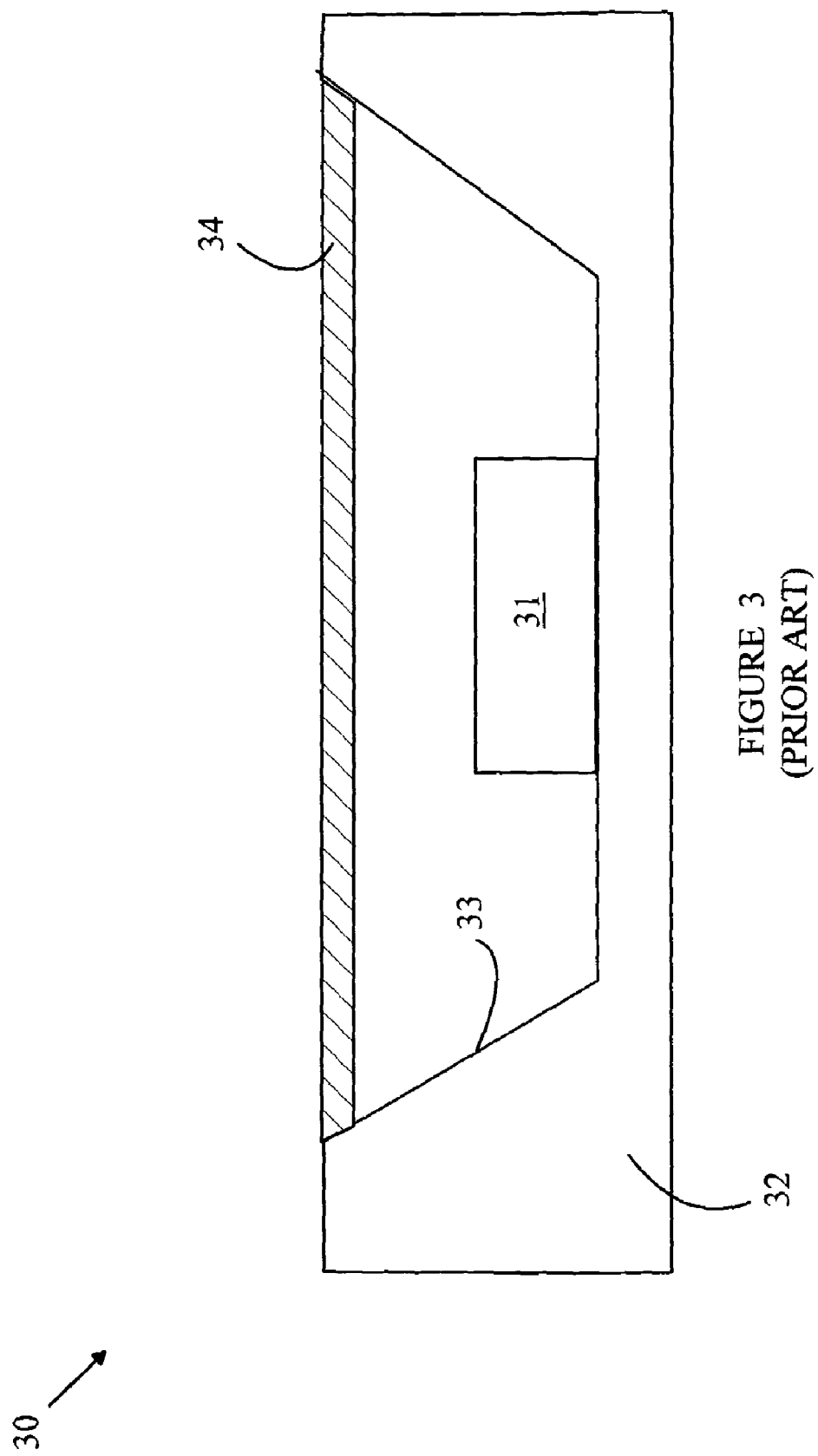
FIG. 3 is a cross-sectional view of a light source constructed from a phosphor-converted LED.

The manner in which the present invention provides its advantages can be more easily understood with reference to FIGS. 1 and 2, which illustrate a prior art light box arrangement for illuminating an LCD display 16. FIG. 1 is a top view of light source 10 and FIG. 2 is a cross-sectional view of light source 10 through line 2-2 shown in FIG. 1. Light source 10 utilizes an array of LEDs 11 to illuminate a light pipe 12. The LEDs are mounted on a circuit board 13 that is mounted on a second board 15 that provides power to the LEDs. The LEDs are positioned such that light leaving the top of each LED via lens 24 illuminates the end 23 of light pipe 12. The light entering light pipe 12 at an angle less than the critical angle with respect to surface 21 is reflected back and forth within light pipe 12 until the light is either absorbed or scattered by particles 22 on surface 17. The scattered light that strikes surface 21 at angles greater than the critical angle escapes from the light pipe and illuminates the back surface of LCD display 16.

The spectral content of the light in the light pipe is sampled by an array of photodiodes shown at 18. Each photodiode in the array includes a wavelength filter that limits the light reaching that photodiode to light in the predetermined band of wavelengths. As noted above, the output from the photodiodes is used by a feedback controller to regulate the currents or duty cycles of the LEDs.

One method that has been suggested for avoiding the differential aging problem is to utilize phosphor converted LEDs to construct the red, blue, and green LEDs. Refer now to FIG. 3, which is a cross-sectional view of a prior art light source constructed from a phosphor-converted LED. Phosphor converted LED 30 includes an LED 31 that is mounted in a well 33 on a substrate 32. The walls of the well are typically reflecting to collect light leaving the side of the LED and redirect that light into the forward direction. The light from LED 31 is used to illuminate a layer of a phosphor 34 that emits light of the appropriate color. For example, a UV emitting LED can be used to illuminate a phosphor layer that emits red light. By changing the phosphor, light of the other colors can be generated using the same type of LED. If all of the LED sources utilize the same type of UV-emitting LED, the differential aging problem discussed above is substantially eliminated, since all of the LEDs will age at the same rate independent of the particular phosphor layer that each LED irradiates.

While such an arrangement reduces the aging problems discussed above, the design shown in FIG. 3 results in additional problems. First, the apparent size of the light source is determined by the area of phosphor that is illuminated by the LED, not by the size of the light emitting area on the surface of the LED. As a result, the size of the light source is significantly larger than the light-emitting area on the LED.

Furthermore, the phosphor layer emits light in all directions. The light that is emitted backwards toward the LED is reflected in the forward direction from the sides of well 33. This further increases the apparent size of the light source, since the light source now appears to be a multi-layered source because of the virtual images of the phosphor layer created by the reflecting walls.

The larger physical size of the light source makes it more difficult to image all of the light from the LED into the light pipe within the proper range of angles to assure total internal reflection of the incident light from the sides of the light pipe. The reduced injection efficiency reduces the overall power-to-light conversion efficiency, and hence, higher power LEDs are needed.

In addition, the phosphor conversion layer only converts a portion of the light from the LED to the desired color. In addition to exciting the desired spectral lines of the phosphor, the LED light excites other absorption processes that lead to emissions in regions of the spectrum that are outside the desired spectral regions. These non-productive absorption events reduce the overall light conversion efficiency of the phosphor.

The phosphor layer is typically constructed by dispersing particles of a phosphor in a clear matrix such as epoxy. The matrix absorbs some of the light from the LED. In addition, the phosphor particles absorb some of the light from the LED without converting that light to the desired wavelength. Further, the phosphor particles scatter some of the LED light at angles that are not directed into the light pipe. Finally, if the phosphor layer is thin, part of the LED light escapes without being converted, and is lost. If the layer is sufficiently thick to absorb all of the incident light, the losses from non-productive absorption processes and scattering are increased.

Figure 4:
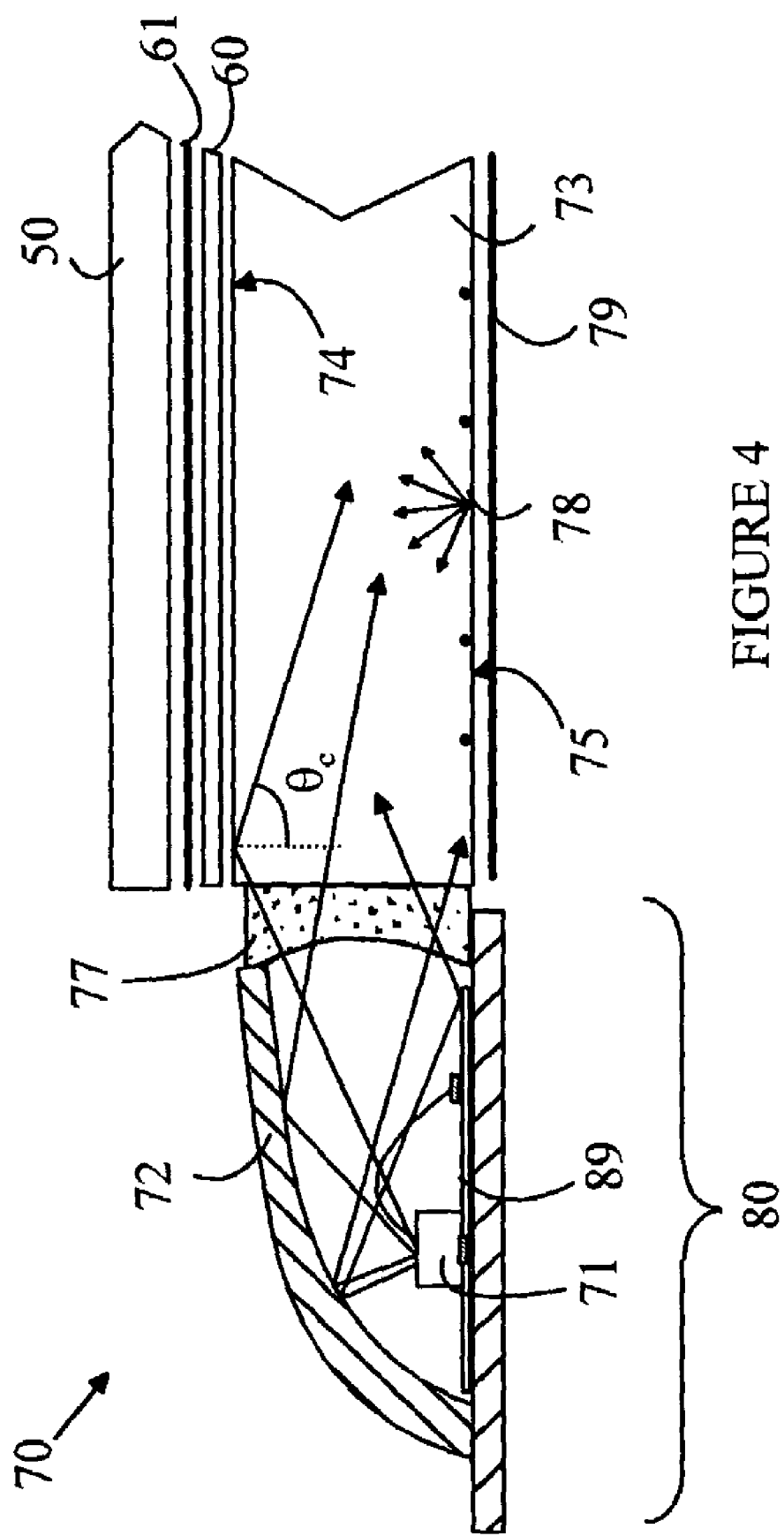
FIG. 4 is a partial cross-sectional view of a light source according to one embodiment of the present invention.

Refer now to FIG. 4, which is a partial cross-sectional view of a light source according to one embodiment of the present invention. Light source 70 illuminates an LCD panel 50 in the embodiment shown in FIG. 4. Light source 70 includes a linear UV light source 80 that is bonded to a light pipe 73 that forms a light mixing box for illuminating a light conversion layer 60 that, in turn, illuminates an LCD panel 50. Light source 70 is connected to light pipe 73 by a region 77 that is filled with an index matching compound.

Light source 70 includes a plurality of UV emitting LEDs that are arranged in a linear array along a direction that is orthogonal to the plane of the drawing. A typical LED is shown at 71. The light leaving LED 71 in the vertical direction is reflected by reflector 72 into light pipe 73. The size and cross-sectional shape of reflector 72 are chosen such that substantially all of the light leaving LED 71 that is initially reflected from the top surface 74 or bottom surface 75 of light pipe 73 is reflected at an angle greater than the critical angle $\theta_c$. In addition, the top surface of substrate 89 on which the dies are mounted can also include a reflecting coating to further improve light collection. Hence, that light will be totally internally reflected back toward the bottom surface 75 of light pipe 73. Upon striking surface 75, the light will either be reflected at an angle that is again greater than the critical angle or scattered by the scattering centers 78 on surface 75. The light that is reflected will once again be totally reflected by surface 74 and redirected back to surface 75. The light that is scattered such that the scattered light strikes surface 74 at an angle less than $\theta_c$ will exit the light pipe and illuminate the bottom surface of light conversion layer 60. Any light that is scattered at angles greater than $\theta_c$ will remain trapped within the light pipe.

Light conversion layer 60 includes a number of phosphors that convert the UV light to light of the desired color spectrum. In this exemplary embodiment, the phosphors are chosen to provide light in the red, blue, and green spectral regions at known illumination levels. The LCD panel includes filters at each pixel that select light from the appropriate spectral range. Any UV light that is not converted by light conversion layer 60 is reflected back into light pipe 73 by a reflector 61 that reflects light of the UV wavelength while passing light in the visible region corresponding to the phosphor spectral regions. The light reflected by reflector 61 passes through light conversion layer 60 a second time, and hence, a significant fraction of this light is converted by the light conversion layer 60. Any remaining light enters light pipe 73 where it is again reflected by the surfaces of light pipe 73 until it is absorbed or again reflected into light conversion layer 60.

Such reflectors are known in the vertically emitting semiconductor layer art where they are utilized as mirrors in the lasers, and hence, will not be discussed in detail here. For the purposes of the present discussion, it is sufficient to note that the reflectors are constructed from a plurality of transparent layers of material such that adjacent layers have different indexes of refraction and thicknesses chosen such that the combined stack forms a coherent reflector at the wavelength in question. It should also be noted that reflector 61 can be optional.

Some of the light scattered by scattering centers 78 will be directed away from surface 74 at angles that would allow the light to escape through surface 75. To prevent the loss of such light, the bottom surface of light pipe 73 can be coated with a reflecting material or a separate reflector 79 can be placed below light pipe 73.

The amount of light that reaches the light pipe can be further increased by utilizing a substrate 89 with a reflective surface. Some of the light leaving die 71 will be reflected such that the light strikes the substrate. If the surface of the substrate is reflective, this light will be directed into the light pipe, thereby increasing the light collection efficiency.

Light conversion layer 60 will typically include one or more phosphors. The specific choice of phosphors and their respective concentrations will depend on the object being illuminated by the light source. In the case of an LCD display, red, blue, and green phosphors are preferred. It should be noted that the LCD panel can correct for errors in the relative concentrations of the phosphors by adjusting the time the corresponding shutters are opened. Hence, if, for example, the red concentration is 10 percent low, the LCD panel can correct for this error by leaving all of the red pixel shutters open for 10 percent longer. Furthermore, in the case of an LCD display, relatively narrow output spectral bands can be utilized.

If, on the other hand, the light source is to be used for eliminating a scene or a transparency having a wide range of colors, the phosphors must be chosen to provide a much broader spectral range. A light source that duplicates the spectral output of an incandescent light source of a particular color temperature is preferred in this situation.

In one embodiment, light conversion layer 60 is constructed by mixing the appropriate phosphors in a clear epoxy resin and then coating the surface of light pipe 73 with the mixture using conventional spin casting techniques to provide a thin uniform layer. UV curable epoxy coatings can be used to provide fast curing of the layer after the spin casting has produced a layer of the desired thickness.

The light conversion layer can also be constructed from a plurality of sub-layers in which each sub-layer provides one of the phosphors. In this case, each of the sub-layers, except the top layer, must permit at least some of the UV light to pass through that layer to provide the excitation illumination for the phosphors in the layers above that layer.

The light conversion layer can also be preformed and then bonded to the surface of the light pipe. In the case of a light conversion layer having a number of sub-layers, the individual sub-layers can be bonded separately. Such prefabricated phosphor layers allow the designer to mix and match particular phosphors at the time the light source is assembled with very little additional equipment or fabrication expertise.

As noted above, scattering from phosphor particles tends to reduce the light conversion efficiency of a light-conversion layer. In one embodiment, the phosphor particles used in the light conversion layer are selected to have a size that is smaller compared to the wavelength of the UV light. Particles in this size range introduce substantially less scattering. Phosphors having particle sizes in this region are well known in the quantum dot phosphor arts. In addition, conventional phosphors with particles in the nano-particle or micron range are known to the art.

In addition, there are soluble organic phosphors that do not suffer from the scattering problems discussed above. The use of such phosphors for light conversion layers in LED light sources is discussed in detail in co-pending patent application Ser. No. 11/025,450, which is hereby incorporated by reference. Since the light conversion layer can be separately synthesized and bonded to the light pipe, problems of material compatibility and temperature restrictions presented by such organic phosphors are substantially reduced in a light source according to the present invention.

Figure 5:
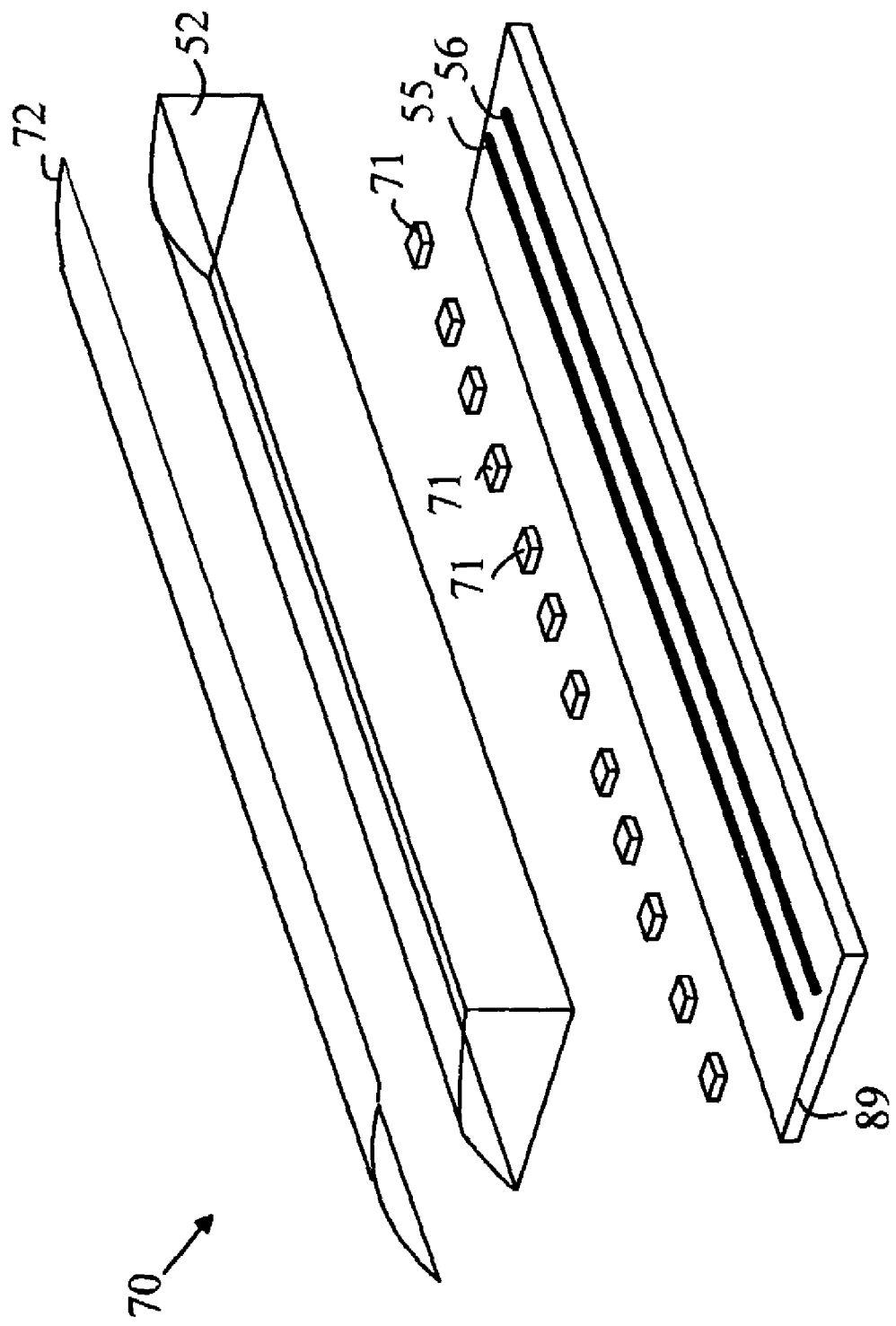
FIG. 5 is an exploded perspective view of light source 70 shown in FIG. 4.

Refer now to FIG. 5, which is an exploded perspective view of light source 70 shown in FIG. 4. As noted above, the individual UV LEDs 71 are arranged in a linear array. The region between reflector 72 and substrate 89 can be filled with a clear medium 52 to protect the dies. In the embodiment shown in FIGS. 4 and 5, the LEDs are powered from two traces shown at 55 and 56. The traces are part of substrate 89. In this embodiment, the individual dies are connected to trace 55 via a contact on the bottom of the die and to trace 56 by a wire bond, and the dies are connected in parallel. However, embodiments that utilize other connection schemes can be utilized. In another embodiment, the dies are connected in series so that each die receives the same current.

The above-described embodiments of the present invention utilize a UV LED to irradiate the phosphor layer. However, embodiments that utilize excitation radiation at other wavelengths can also be constructed. For example, there are many phosphors that convert blue light to longer wavelengths. In this case, the portion of the excitation light that is not converted by the light conversion layer forms a portion of the illumination from the light source. For example, a white light source can be constructed by using a blue LED to illuminate a light conversion layer that converts a portion of the blue light to red and green light. In such a light source, the optional reflector shown at 61 in FIG. 4 is omitted. The amount of excitation light that is utilized in the final spectrum will, in general, depend on the particular application and design. In one embodiment, at least 10 percent of the excitation light leaves the phosphor layer unconverted.

Various modifications to the present invention will become apparent to those skilled in the art from the foregoing description and accompanying drawings. Accordingly, the present invention is to be limited solely by the scope of the following claims.

What is claimed is:

1. An apparatus comprising:
a light pipe comprising a layer of transparent material having a top surface, a bottom surface, and an edge surface, said light pipe being positioned to receive said light within a cone of angles through said edge surface such that said light within said predetermined cone of angles is totally reflected from said top surface, said light pipe comprising features that redirect some of said light within said cone of angles at angles such that some of said redirected light exits through said top surface;
a light source comprising a plurality of LED dies arranged in an array on a substrate, said substrate being coplanar with said light pipe, each LED emitting light having an excitation wavelength, said light source emitting light within a cone of angles, said light source further comprising a reflector adjacent said plurality of LED dies to reflect light from said LED dies into said edge surface of said light pipe;
an index matching compound between said light source and said light pipe edge surface; and
a light conversion layer overlying said top surface, said light conversion layer converting light of said excitation wavelength to light in an output spectrum having wavelengths different from said excitation wavelength;
wherein said light conversion layer comprises soluble phosphor compounds dissolved in a transparent medium;
wherein a portion of said light of said excitation wavelength exits from said light conversion layer, said portion being greater than 10 percent of said light of said excitation wavelength that enters said light conversion layer.

2. An apparatus comprising:
a light source comprising a plurality of LED dies arranged in an array on a substrate, each LED emitting light having an excitation wavelength, a reflector mounted above said plurality of LED dies to reflect light into a cone of angles;
a light pipe comprising a layer of transparent material having a top surface, a bottom surface, and an edge surface, said light pipe being coplanar with said light source, said light pipe being positioned to receive said light within said cone of angles through said edge surface such that said light within said predetermined cone of angles is totally reflected from said top surface, said light pipe comprising features that redirect some of said light within said cone of angles at angles such that some of said redirected light exits through said top surface;
an index matching compound disposed between said light source and said edge surface of said light pipe; and
a light conversion layer overlying said top surface, said light conversion layer converting light of said excitation wavelength to light in an output spectrum having wavelengths different from said excitation wavelength;
wherein said excitation wavelength is between 200 nm and 485 nm; and
wherein a portion of said light of said excitation wavelength exits from said light conversion layer, said portion being greater than 10 percent of said light of said excitation wavelength that enters said light conversion layer.

3. An apparatus comprising:
a light source comprising a plurality of LED dies arranged in an array, each LED emitting light having an excitation wavelength, said light source emitting light within a cone of angles; a light pipe comprising a layer of transparent material having a top surface, a bottom surface, and an edge surface, said light pipe being positioned to receive said light within a cone of angles through said edge surface such that said light within said predetermined cone of angles is totally reflected from said top surface, said light pipe comprising features that redirect some of said light within said cone of angles at angles such that some of said redirected light exits through said top surface; a light conversion layer overlying said top surface, said light conversion layer converting light of said excitation wavelength to light in an output spectrum having wavelengths different from said excitation wavelength, wherein a portion of said light of said excitation wavelength exits from said light conversion layer, said portion being greater than 10 percent of said light of said excitation wavelength that enters said light conversion layer; and a display layer overlying said light conversion layer, said display layer being illuminated by light leaving said light conversion layer; wherein said display comprises a transparency.

4. The apparatus of claim 3 wherein said output spectrum is perceived as being white light by a human observer.

* * * * *